T. M. LILLISTON.

PEANUT PICKER.

APPLICATION FILED FEB. 10, 1914.

Reissued Apr. 21, 1914.

13,717.

5 SHEETS—SHEET 1.

Witnesses
P. H. Ross
Earle L. Parmelee

Inventor
Thomas M. Lilliston
By George W. Ramsey
Attorney

T. M. LILLISTON.

PEANUT PICKER.

APPLICATION FILED FEB. 10, 1914.

Reissued Apr. 21, 1914.

13,717.

5 SHEETS—SHEET 2.

Witnesses

P. H. Ross

Earle L. Parmelee

Inventor

Thomas M. Lilliston by George W. Rainey

Attorney

T. M. LILLISTON.

PEANUT PICKER.

APPLICATION FILED FEB. 10, 1914.

Reissued Apr. 21, 1914.

13,717.

5 SHEETS—SHEET 3.

Witnesses

P. H. Ross

Earle L. Parmelee

Inventor

Thomas M. Lilliston by George W. Ramsey

Attorney

T. M. LILLISTON.

PEANUT PICKER.

APPLICATION FILED FEB. 10, 1914.

Reissued Apr. 21, 1914.

13,717.

5 SHEETS—SHEET 4.

Witnesses

P. H. Ross

Carl L. Parmelee

Inventor,

Thomas M. Lilliston.

by George W. Ramsey

Attorney

T. M. LILLISTON.

PEANUT PICKER.

APPLICATION FILED FEB. 10, 1914.

Reissued Apr. 21, 1914.

13,717.

5 SHEETS—SHEET 5.

Witnesses
P. H. Ross
Carle L. Parmelee

Inventor,
Thomas M. Lilliston.
by George W. Ramsey
Attorney

UNITED STATES PATENT OFFICE.

THOMAS M. LILLISTON, OF SUFFOLK, VIRGINIA, ASSIGNOR TO NATIONAL MACHINE CORPORATION, OF SUFFOLK, VIRGINIA.

PEANUT-PICKER.

13,717. Specification of Reissued Letters Patent. Reissued Apr. 21, 1914.

Original No. 1,017,570, dated February 13, 1912, Serial No. 628,692. Application for reissue filed February 10, 1914. Serial No. 817,795.

*To all whom it may concern:*

Be it known that I, THOMAS MILICUT LILLISTON, a citizen of the United States, residing at Suffolk, in the county of Nansemond and State of Virginia, have invented certain new and useful Improvements in Peanut-Pickers, of which the following is a specification, reference being had therein to the accompanying drawings.

This invention relates to machines for separating peanuts from the vines and for removing the dirt therefrom, cutting the stems from the nuts and delivering the peanuts picked, stemmed, and cleaned into suitable receptacles with the vines separately delivered for use as cattle feed.

The invention has for its object to provide an improved machine of this kind constructed and arranged as hereinafter set forth and claimed.

Figure 1:
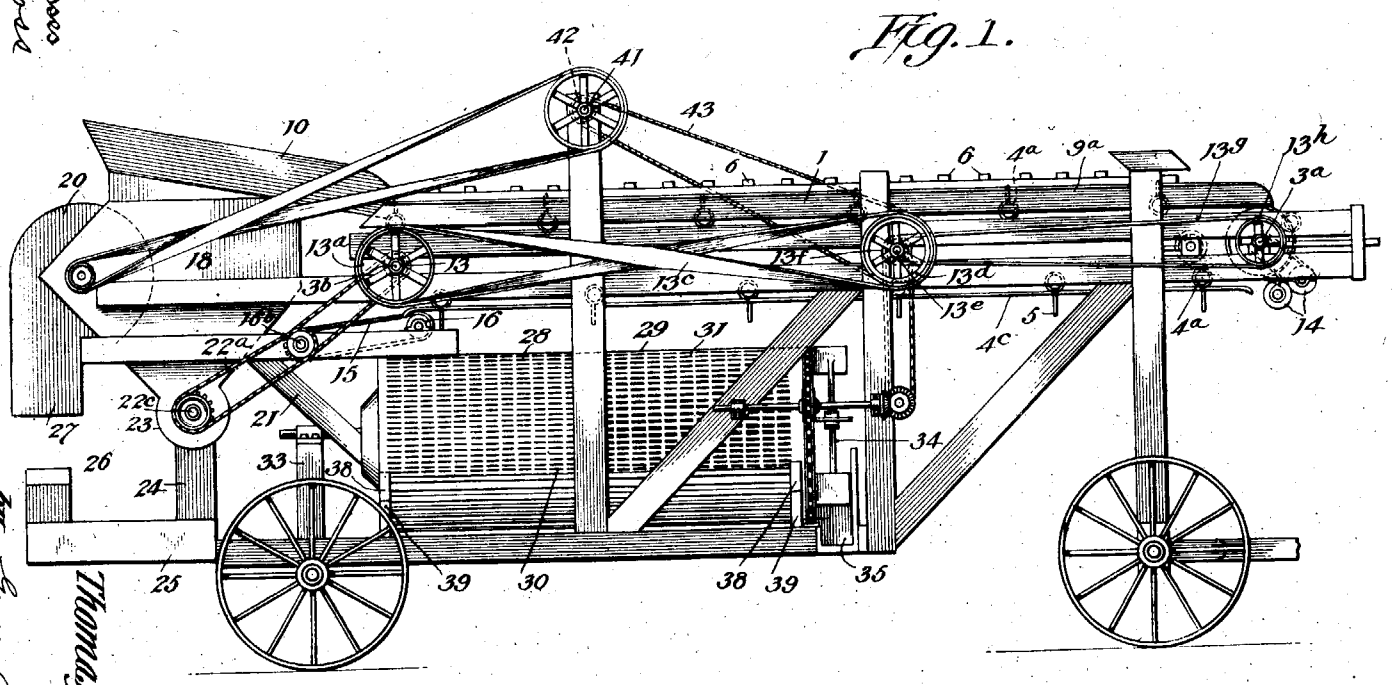
Figure 2:
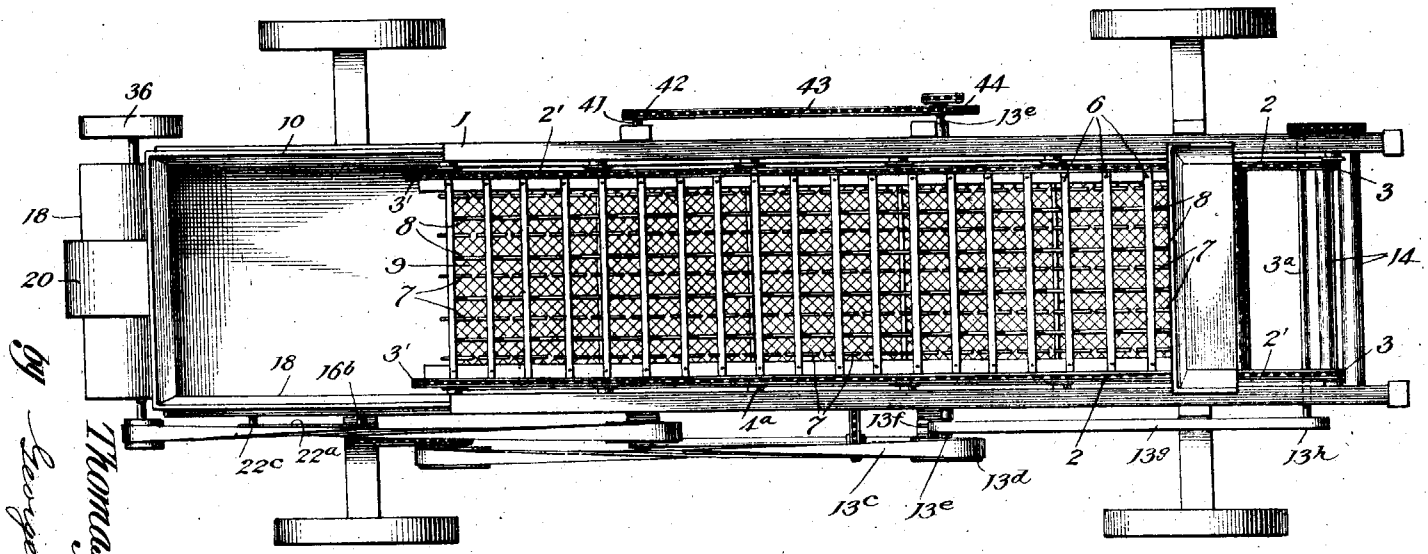
Figure 3:
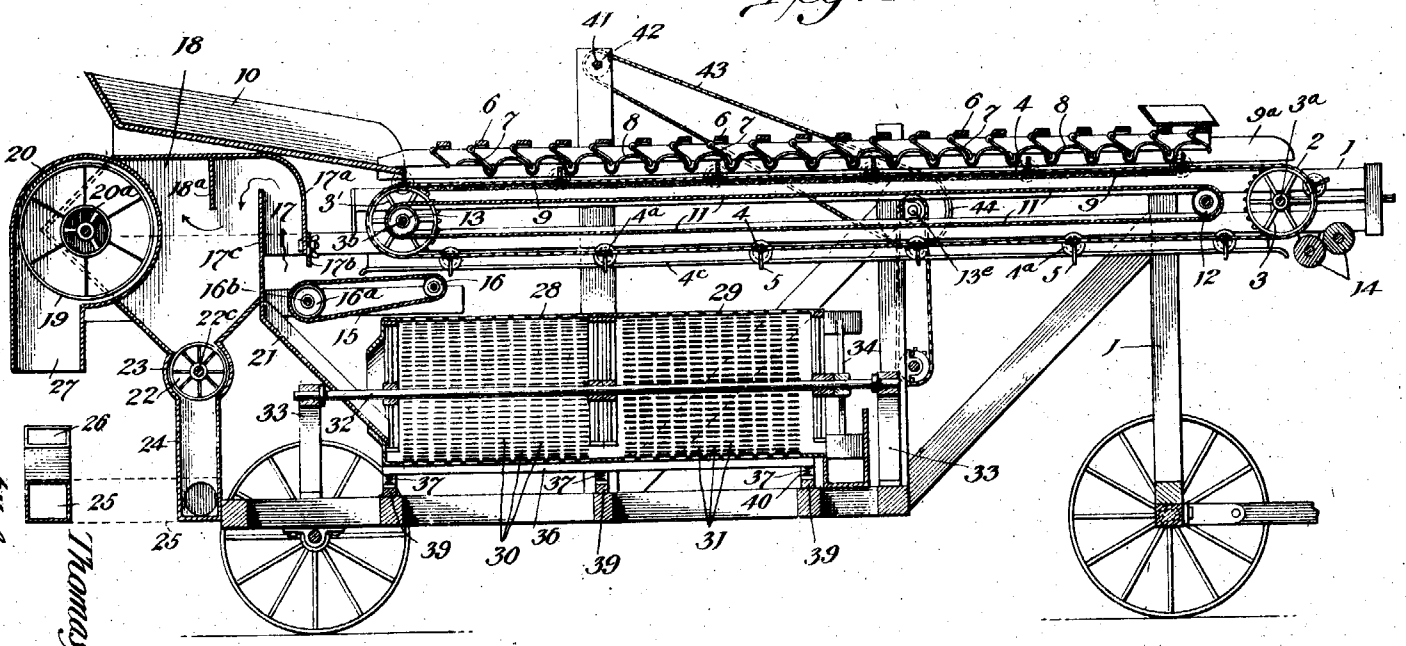
Figure 4:
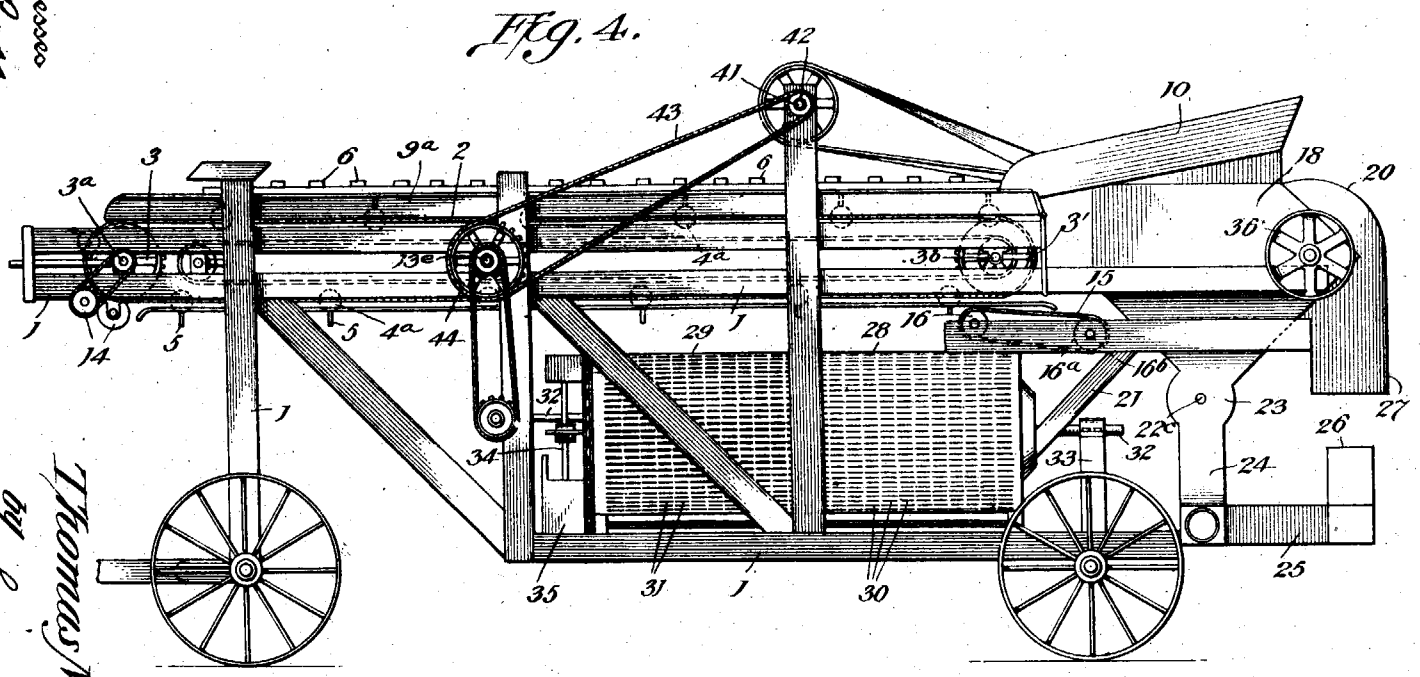
Figure 5:
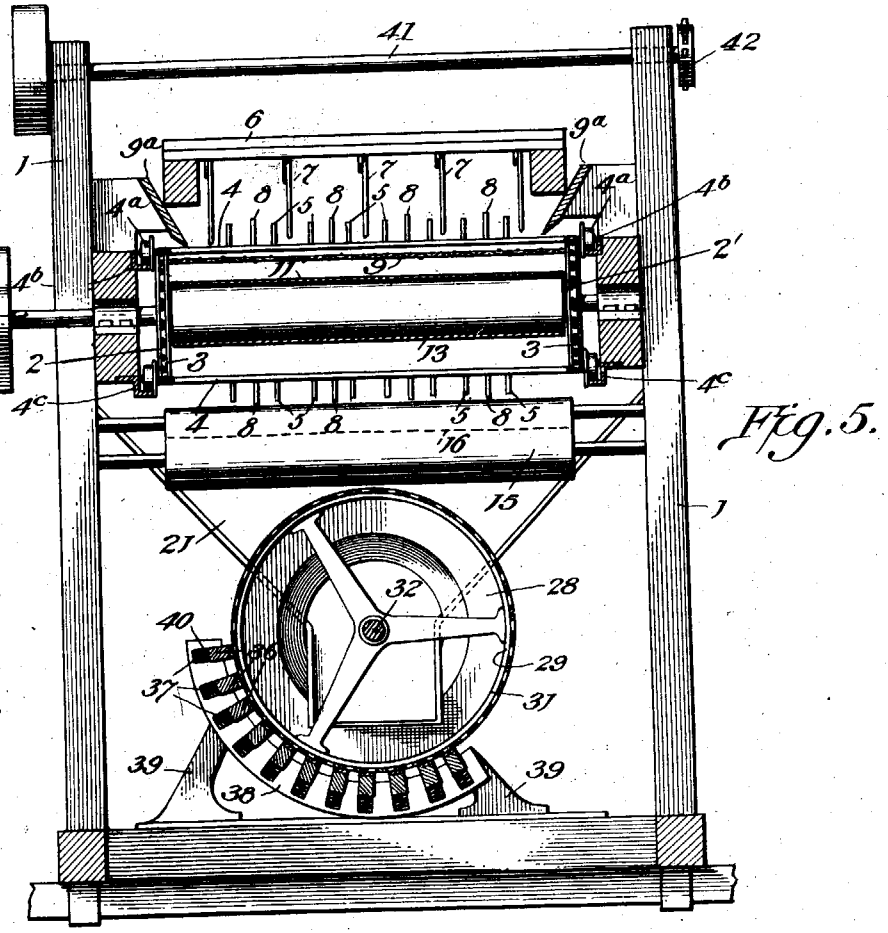
Figure 6:
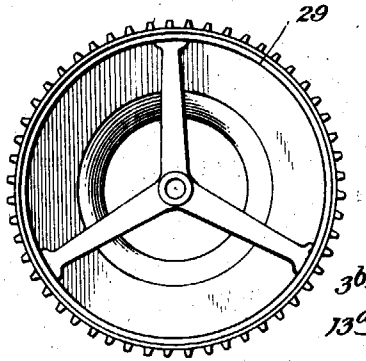
Figure 7:
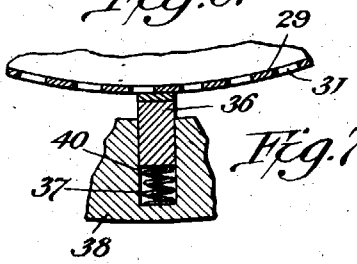
Figure 8:
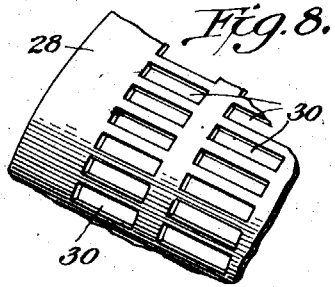

Referring to the accompanying drawings:—Figure 1 is a side view of a machine for separating peanuts from the vines which is constructed in accordance with this invention. Fig. 2 is a plan view thereof. Fig. 3 is a view in longitudinal section of the machine. Fig. 4 is a side view of the machine on the opposite side from that shown in Fig. 1. Fig. 5 is an enlarged view in cross section thereof. Fig. 6 is a detail end view of the rotary cylinder for separating the stems from the peanuts and cleaning the same. Fig. 7 is an enlarged detail view in vertical section of a portion of the cylinder for removing the stems and a portion of the device for cutting off the stems. Fig. 8 is a detail view in perspective of a portion of the periphery of the cylinder for separating the stems from the peanuts.

In the upper part of the frame 1 of the machine which is mounted on wheels, are endless chains 2 and 2′ which extend over two pair of toothed wheels 3 and 3′ respectively. The front pair of toothed wheels 3 is fixedly mounted on the shaft $3^a$ and constitute the driving means for the endless carrier chains 2 and 2′. The rear pair of toothed wheels 3′ is loosely mounted on the shaft $3^b$, which shaft is rotated in the opposite direction from the rotation of these wheels as will be hereinafter explained. The frame 1 is provided with transverse slats located apart from each other, each of the slats 4 being provided with a row of vertical pins 5, preferably of irregular length, the several parts being more particularly shown in Figs. 2, 3, and 5, and located at intervals apart from end to end of the top of the frame of the machine are transverse bars 6 each having a row of depending spring like projections 7 which are located at intervals between the pins 5. Mounted above and extending transversely to the bars 4 are several iron rods 8 which from end to end are of an undulating shape and which coöperate with the pins 5 and the depending spring like projections 7 to separate the peanuts from the vines.

Below the top flight of the endless belt 2 is provided a wire netting 9 secured beneath the transverse slats 4.

The slats 4 are slightly longer than the distance between the chains 2 and 2′ and each slat is provided on each end with a flanged roller $4^a$. This roller $4^a$ traverses tracks $4^b$ on the upper run of the carrier chains and tracks $4^c$ on the lower run. (See Fig. 5.) This construction obviates the friction of dragging the carrier over the surface of the picking screen, hereinafter specified, and also transmits a part of the weight of the vines directly to the frame of the machine. The spring like projections 7 are inclined downwardly and forwardly in the direction of movement of the upper run of the carrier chains. When the machine is in operation the peanut vines being pulled under the spring like projections 7 by the pins 5 on the slats 4, causes the spring like projections 7 to be flexed upwardly and thereby to exert a downward pressure which tends to spread the vines and at the same time keep the vines closely pressed upon the picking screen comprising the wire netting 9. The flanged wheels $4^a$ maintain the slats 4 a slight distance above the picking screen and thus prevent crushing or breaking the nuts which may be caught in the meshes of the picking screen, and at the same time relieve the picking screen of some of the downward pressure. In order to prevent the vines from being spread out over the carrier chains the guard boards $9^a$ are provided. (See Fig. 5.) These boards maintain the vines properly over the working portion of the picking screen.

Located at the rear end of the machine and at the end of the endless belt 2 is a hopper 10 on which the vines which have been dug up are fed to the endless belt 2. The vines being fed to the endless belt 2 are carried forward from the same beneath the spring like projections 7 and the peanuts are separated from the vines in passing between said projections. The majority of the peanuts however, are pulled from the vines by the peanuts being caught in the meshes of the wire netting 9 which comprises the picking screen. The meshes of this screen are comparatively coarse. (See Fig. 2.) The movement of the vines under the fingers 7 and over the picking screen tends to loosen the vines so that the nuts drop through and are caught in the meshes of the wire netting 9, and since the slats 4, and the pins 5, thereon, drag the vines forward the nuts are pulled from the vines and drop upon the endless belt 11. This endless belt 11 may be made of any strong cloth, for example, canvas, and it is mounted upon an idler roller 12 at one end and a driving roller 13 at the other end. The driving roller 13 is fixedly mounted on the shaft $3^b$ and is positively driven by the driving wheel $13^a$ which is driven by means of the cross belt $13^c$. It will be noted that the cross belt $13^c$ runs over the pulley $13^d$ on the shaft $13^e$ which carries the pulley $13^f$ that drives the shaft $3^a$ through the belt $13^g$ and the pulley $13^f$. By this chain of belting previously described, it will be noted that the shaft $3^a$, which drives the carrier chains 2 and 2′ by means of the front toothed wheels 3 rotates in the opposite direction from the shaft $3^b$, which positively drives the cloth or canvas belt 11 through the driving roller 13 and on which shaft the rear pair of toothed wheels idly rotate. Should any of the vines not be carried off of the endless belt 2 they will be caught up by the rollers 14 located adjacent to the toothed pulley 3 and will be carried thereby to the ground.

Located beneath the rear pair of toothed wheels 3 and 3′ is an endless belt 15 mounted on rollers 16 and $16^a$ (Fig. 3). The peanuts and such trash as passes through the picking screen, formed by the wire netting 9, is carried by the canvas belt 11 to the rear of the machine and dropped upon the short endless belt 15. This belt terminates beneath the suction passageway 17 of the hopper shaped casing 18 and above the inclined chute 21 which leads to a stemming and cleaning drum that will hereinafter be described. The passageway 17 is formed of a short front wall $17^a$ provided with an adjustable gate $17^b$ that is located substantially over the roll $16^a$. The rear wall of the passageway 17 comprises a vertical upwardly extending partition $17^c$. A short partition or baffle $18^a$ is arranged to depend from the top of the casing 18 downwardly to a distance which is greater than the space between the partition $17^c$ and the top of the casing 18. A suction fan 19 (shown diagrammatically in Fig. 3) is mounted within a fan casing 20, the side openings $20^a$ of which lead directly to the chamber within the casing 18. The lower portion of the casing 18 is comprised of converging walls at the apex of which is arranged a small fan, or more correctly a short screw conveyer 22 (also shown diagrammatically in Fig. 3) in a casing 23. This fan or conveyer 22 is operated at relatively low speed as will be observed by inspecting Fig. 1 wherein it will be noted that this member is driven by the chain drive $22^a$ from the shaft which drives the short belt 15, and that the fan or conveyer shaft $22^c$ rotates at slightly less speed than the shaft $16^b$ which carries the pulley $16^a$ that drives the short belt 15.

The casing 23 carrying the fan or conveyer 22 is connected by means of a depending chute 24 with a chamber 25 which is provided with a lateral opening through which the trash is discharged or may be removed. The casing 25 is provided with a vertical passage way 26, open at its upper end and located at a spaced distance from the opening of the passage way 27 leading from the fan casing 20. By means of this construction the air passing downward through the passage way 27 into the passage way 26 will not be so strong as to drive the collected matter in the casing 25 through the passage way 24 into the casing 18.

By inspection of the casing 18 and connected parts, as shown in Figs. 2 and 3, it will be noted that it encompasses a relatively large chamber having the suction fan 20 located at one lateral extremity and effective to exhaust the air, and a relatively restricted opening 17 at the other lateral extremity, with a comparatively large air pocket or chamber between the inlet 17 and the exhaust openings $20^a$, and with baffles between the inlet and exhaust openings. It will further be noted that the belt 15 passes over the roller $16^a$ that extends under approximately half the inlet or suction passageway 17, and that the passageway 17 terminates above the end of this belt 15, and finally that the suction passageway 17 is near or adjacent the place where the vines are fed to the picking screen.

Peanuts are usually grown in a light sandy soil and a considerable amount of dirt adheres to the pods and vines when the crop is harvested. The picking, by such devices as my machine, usually is done when the vines are comparatively dry, consequently during this operation considerable dust and dirt is knocked from the vines. Unless this is removed it settles on the stripped vines when they leave the machine and is derogatory to their use as cattle feed, otherwise cleaned peanut vines are fine stock food. The zone of maximum free dust and dirt is where the vines enter the picking table, namely, the ends of the picking screen adjacent the feed hopper 10. The location of the mouth of the suction passageway 17 near or adjacent this zone enables substantially all light dust to be drawn into the suction chamber 18. Heavier particles and peanuts fall through the picking screen onto the carrier belt 11 and are dropped therefrom onto the short belt 15. This fall loosens such dirt as sticks to the nuts, and the loosened dirt together with twigs, pieces of leaves, light empty hulls, or pods, etc., are caught by the strong ascending current of air as they are carried under the passageway 17 by the belt 15 and are lifted into the casing 18 where the velocity of the air is comparatively slow and the heavier particles therefore fall, while only the very light dust is carried over into the fan casing 20 and discharged at 27. The matured nuts fall from the belt 15 into the inclined chute 21. The inclined chute 21 projects into the open end of a rotary cylinder formed in two sections 28 and 29, the section 28 being formed with small apertures 30 in its periphery, and the section 29 being formed with larger apertures 31 in its periphery.

The rotary cylinder is mounted on a shaft 32 having its bearings in uprights 33 and has mounted upon it outside of one end of the cylinder a fan 34, the leaves of which move through a gutter 35. The peanuts having been delivered into the rotary cylinder from the inclined shaft 21 are rolled and tumbled about in the sections of the rotary cylinder and the dirt drops through the perforations 30 in the first section of the cylinder while the larger trash and remaining dirt drops through the larger perforations 31 in the second section of the cylinders, the dirt being removed from the peanuts by attrition in the cylinder thereby cleaning the peanuts. The stems of the peanuts protruding through the perforations as the cylinder rotates are cut off by means of steel edged blades 36 located in sockets 37 in a curved support 38 mounted on brackets 39 adjacent to the periphery of the cylinder, said knives 36 being yieldingly mounted on springs 40 so as to be held by yielding pressure against the periphery of the cylinder. It will be seen that by means of this construction as the cylinder rotates the peanut stems projecting through the apertures in its periphery will be cut off by the knives 36. The peanuts, now being separated from the trash, the stems and dirt, are fed over into the trough 35 and conveyed by the fan 34 out of the trough into suitable receptacles.

What I claim is:—

1. In a machine of the character described, an endless slat conveyer having transverse rows of picker pins, transverse rows of picker pins located above said endless conveyer and coöperating with the picker pins on the endless conveyer, a wire netting beneath the upper run of said conveyer, an endless belt located within the endless conveyer and movable in the opposite direction, and a second endless belt located adjacent to one end of the first named belt and adapted to receive the peanuts from the first named belt.

2. In a machine of the character described, an endless slat conveyer having transverse rows of picker pins, transverse rows of picker pins located above said endless conveyer and coöperating with the picker pins on the endless conveyer, an endless belt located within the conveyer and movable in the opposite direction, a wire netting between said conveyer and said belt, a second endless belt located adjacent to one end of the first named belt for receiving peanuts from the first named belt, and an inclined chute adjacent to one end of said last named belt.

3. In a machine of the character described, an endless conveyer having transverse rows of picker pins, stationary transverse rows of picker pins above said conveyer, longitudinal undulating wires located above said endless conveyer and coöperating with the picker pins thereon, and a wire netting beneath the upper run of said conveyer.

4. In a peanut picker in combination, a stationary picking screen, spring fingers tending to press the peanut vines against the picking screen, a conveyer having slats to carry the vines over the picking screen, and supporting means for said conveyer slats, said supporting means including tracks mounted adjacent the edges of said picking screens, and wheels carried by said slats and constructed to run on said tracks.

5. In a peanut picker in combination, a relatively long stationary picking screen, resilient spring fingers mounted above said picking screen and tending to spread the vines laterally over the screen, a conveyer including side chains and cross slats to drag the vines over said picking screen and under the spring fingers, and guard boards extending lengthwise on each side of said screen and between said spring fingers and said side chains to prevent the vines being spread over on and being caught by said side chains.

6. In a peanut picker in combination, means to separate the nuts from the vines, an upper endless belt to receive the nuts, a lower endless belt beneath the delivery end of the upper belt, said belts being arranged to provide a space through which the peanuts fall freely in being transferred from the upper belt to the lower belt; and a suction passageway arranged over said lower belt adjacent where the peanuts fall on said lower belt.

7. In a peanut picker in combination, a picking screen, a feed trough to direct vines to said picking screen, a suction mechanism having a suction opening relatively near the place where the vines enter upon the picking screen, means to spread and stir the vines, said means including a conveyer to drag the vines over the picking screen and away from said suction opening, and means to convey the peanuts toward and beneath the suction opening.

8. In a peanut picker in combination, mechanism to pick the peanuts from the vines, means to receive the peanuts from the picking mechanism, an endless apron upon which said peanuts are dropped by said receiving means, the discharge end of said endless apron passing over a roller located partly beneath the lower end of a vertical passageway, and means to maintain a partial vacuum in said passageway to provide an upward current of air through which the peanuts fall when discharged from said apron.

THOMAS M. LILLISTON.

Witnesses:
R. L. WOODWARD,
GEO. L. BARTON.

---

Disclaimer in Letters Patent Reissue No. 13,717.

DISCLAIMER.

13,717. (Reissue.)—*Thomas M. Lilliston*, Suffolk, Va. PEANUT-PICKER. Patent dated April 21, 1914. Disclaimer filed January 27, 1915, by the assignee, *National Machine Corporation.*

Enters disclaimer—

"To the following portion of said reissue patent:

Page 1, lines 92 and 93, it specifically disclaims 'spread the vines and at the same time.'

"Page 1 of the specification, line 102, it disclaims all mechanical or positive lateral, or horizontal spreading and includes only such retarding action of the vines as would take place in passing under the depending spring like projections 7.

"It disclaims the whole of claim 5, which is as follows:

"'In a peanut picker in combination, a relatively long stationary picking screen, resilient spring fingers mounted above said picking screen and tending to spread the vines laterally over the screen, a conveyer including side chains and cross slats to drag the vines over said picking screen and under the spring fingers, and guard boards extending lengthwise on each side of said screen and between said spring fingers and said side chains to prevent the vines being spread over on and being caught by said side chains.'

"In claim 7, as to 'means to spread and stir the vines,' it disclaims all 'means' to horizontally or laterally 'spread' and horizontally or laterally 'stir' the vines, and limits the specified element to such mechanisms as thin the vines longitudinally by dragging the vines under a relatively stationary member or members."

[*Official Gazette, February 9, 1915.*]

picking screen, a feed trough to direct vines to said picking screen, a suction mechanism having a suction opening relatively near the place where the vines enter upon the picking screen, means to spread and stir the vines, said means including a conveyer to drag the vines over the picking screen and away from said suction opening, and means to convey the peanuts toward and beneath the suction opening.

8. In a peanut picker in combination, mechanism to pick the peanuts from the vines, means to receive the peanuts from the picking mechanism, an endless apron upon which said peanuts are dropped by said receiving means, the discharge end of said endless apron passing over a roller located partly beneath the lower end of a vertical passageway, and means to maintain a partial vacuum in said passageway to provide an upward current of air through which the peanuts fall when discharged from said apron.

THOMAS M. LILLISTON.

Witnesses:
R. L. WOODWARD,
GEO. L. BARTON.

---

Disclaimer in Letters Patent Reissue No. 13,717.

DISCLAIMER.

13,717. (Reissue.)—*Thomas M. Lilliston*, Suffolk, Va. PEANUT-PICKER. Patent dated April 21, 1914. Disclaimer filed January 27, 1915, by the assignee, *National Machine Corporation.*

Enters disclaimer—

"To the following portion of said reissue patent:

Page 1, lines 92 and 93, it specifically disclaims 'spread the vines and at the same time.'

"Page 1 of the specification, line 102, it disclaims all mechanical or positive lateral, or horizontal spreading and includes only such retarding action of the vines as would take place in passing under the depending spring like projections 7.

"It disclaims the whole of claim 5, which is as follows:

"'In a peanut picker in combination, a relatively long stationary picking screen, resilient spring fingers mounted above said picking screen and tending to spread the vines laterally over the screen, a conveyer including side chains and cross slats to drag the vines over said picking screen and under the spring fingers, and guard boards extending lengthwise on each side of said screen and between said spring fingers and said side chains to prevent the vines being spread over on and being caught by said side chains.'

"In claim 7, as to 'means to spread and stir the vines,' it disclaims all 'means' to horizontally or laterally 'spread' and horizontally or laterally 'stir' the vines, and limits the specified element to such mechanisms as thin the vines longitudinally by dragging the vines under a relatively stationary member or members."

[*Official Gazette, February 9, 1915.*]